Oct. 19, 1971    HIDEO OKOSHI    3,613,397
CONSTANT-VELOCITY UNIVERSAL JOINT
Filed Feb. 3, 1970    5 Sheets-Sheet 1

INVENTOR.
HIDEO OKOSHI
BY Harry G. Shapiro
ATTORNEY

Oct. 19, 1971

HIDEO OKOSHI 3,613,397

CONSTANT-VELOCITY UNIVERSAL JOINT

Filed Feb. 3, 1970

INVENTOR.
HIDEO OKOSHI

BY Harry G. Shapiro

ATTORNEY

INVENTOR.
HIDEO OKOSHI
BY Harry G. Shapiro
ATTORNEY

INVENTOR.
HIDEO OKOSHI
BY
*Harry G. Shapiro*
ATTORNEY

United States Patent Office 3,613,397
Patented Oct. 19, 1971

3,613,397
CONSTANT-VELOCITY UNIVERSAL JOINT
Hideo Okoshi, Fujisawa-shi, Japan, assignor to Nippon Seiko Kabushiki Kaisha, Tokyo, Japan
Filed Feb. 3, 1970, Ser. No. 8,314
Claims priority, application Japan, Feb. 7, 1969, 44/8,753; Mar. 22, 1969, 44/21,231
Int. Cl. F16d 3/30
U.S. Cl. 64—21                                    2 Claims

ABSTRACT OF THE DISCLOSURE

The constant-velocity universal joint consists of an inner and outer joint members. The inner joint member has two conical surfaces on the outer surface thereof, while the outer joint member has two conical surfaces on the inner surface thereof. Each conical surface on the inner joint member is faced to each conical surface on the outer joint member. The facing conical surfaces incline relative to the axial center line of the two members by an angle one-half of the joint angle $\alpha$, and the intersection line of each pair of facing conical surfaces is on a plane perpendicular to the axial center line (FIG. 1). By this arrangement, the balls can be retained within the guide grooves and the both joint members can be inclined within the joint angle.

The present invention relates to a constant-velocity universal joint of the type in which the power can be transmitted between two shafts which are slidable in the axial direction and intersect with each other and balls are utilized as power transmitting elements.

In the conventional universal joint of the type described, the retainer is generally used in order to prevent the balls from coming off or removing away from the joint especially when the shafts are inclined with each other. However, the defect of the universal joint of this type is that the power transmission is adversely affected due to the machining tolerance and wear of the retainer. In order to eliminate such defects, there has been proposed a universal joint of the type in which no retainer is employed and the balls are guided only by the ball retaining grooves formed in the joint members.

However, according to the conventional retainer-less type the angle of inclination between both of the joint members of the universal joint tend to vary to a large extent depending upon the relative axial position between the members without being held in a stationary position. When the angle of inclination is increased, the balls tend to come off from the joint or to be locked so that the relative slidable distance between two joint members cannot be increased.

In view of the above, the primary object of the present invention is to eliminate such defects encountered in the conventional universal joints. According to the present invention, both of the joint members will not be inclined at an angle in excess of a predetermined angle of inclination even if the shafts are inclined through a large angle or moved toward or away from each other, thereby preventing the falling off of the balls and locking thereof and increasing the distance over which the two joint members can relatively slide.

This invention provides an improvement on a constant-velocity universal joint comprising an outer joint member having a shaft coupled thereto, an inner joint member having a shaft coupled thereto, an even number of power transmitting balls interposed between the outer and inner joint members and ball movement stop means fixedly secured to either one of the inner and outer joint members, each ball being fitted into two intersecting grooves at the intersection thereof, and adapted to be guided in movement only by said grooves, one of the grooves being formed in the inner surface of the outer joint member in such a manner that two grooves are symmetrically inclined and intersected with each other, the other grooves being formed in the outer surface of the inner joint member in such a manner that two grooves are symmetrically inclined with each other in the directions opposite to those of said grooves and intersected to each other, the loci of the centers of the radii of said grooves being the straight lines lying in each of planes whose number is one-half the number of said balls and which are equidistantly spaced apart from the axes of the outer and inner joint members when the axes are aligned with each other, a space being defined between the inner surface of the outer joint member and the outer surface of the inner joint member.

The features and advantages of this invention will be more apparent from the following description referring to illustrative embodiments shown in the attached drawings, in which:

FIG. 1 is a front view thereof having 6 balls when the axes of driven and drive shafts are aligned with each other;

FIG. 2 is a partial sectional view taken along the lines $II_A$–$II_{A'}$ and $II_B$–$II_{B'}$ of FIG. 1 when viewed in the direction indicated by arrow $II_C$–$II_{C'}$ with the outer joint member being shown in section;

FIG. 3 is a sectional view of the outer joint member viewed in the direction indicated by arrows III–III' in FIG. 1;

FIG. 4 is a sectional view of the ball groove of the outer joint member;

FIG. 5 is a sectional view of the ball retaining groove of the inner joint member;

FIGS. 6 and 7 are projections in which ball retaining grooves of both of the outer and inner joint members are projected upon one plane. FIG. 6 illustrating the state when the axes are aligned with each other while FIG. 7, the state when the axes are inclined with each other;

FIG. 8 is an enlarged view of one portion of the outer and inner joint members;

FIGS. 9 and 10 illustrate the states in which both of the outer and inner joint members are in slidable motion relative to each other in the axial direction while their axes are inclined with each other with the outer joint member being shown in cross section as in the case of FIG. 2;

FIG. 11 is a partial sectional view similar to FIG. 2;

FIG. 12 is an enlarged view of one portion of the outer and inner joint members;

FIG. 13 shows the state in which axial centre lines are intersected to the largest extent with each other.

Figure 1:
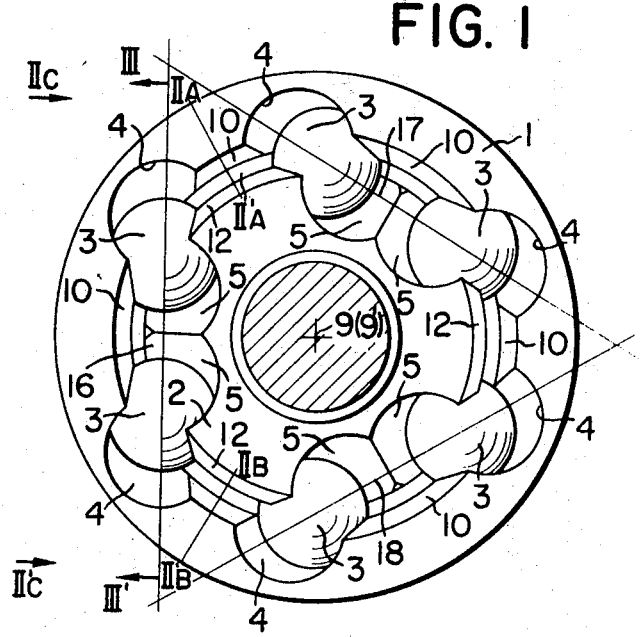
FIGS. 1 to 10 show first embodiment of this invention.
Figure 2:
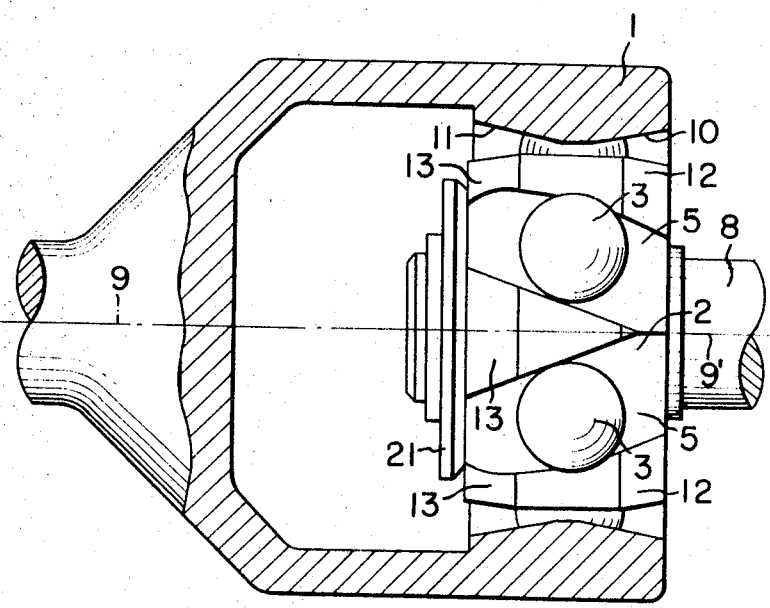
Figure 3:
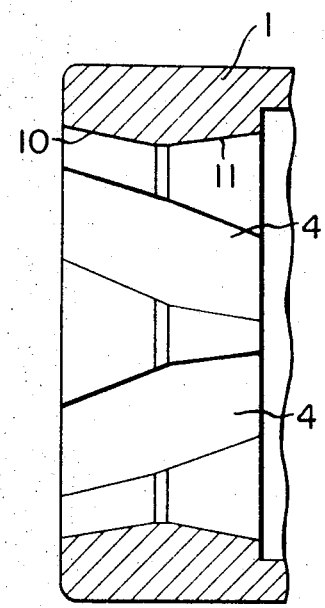
Figure 4:
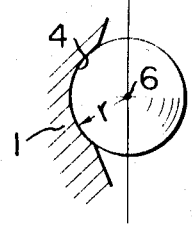
Figure 5:
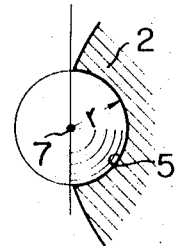
Figure 6:
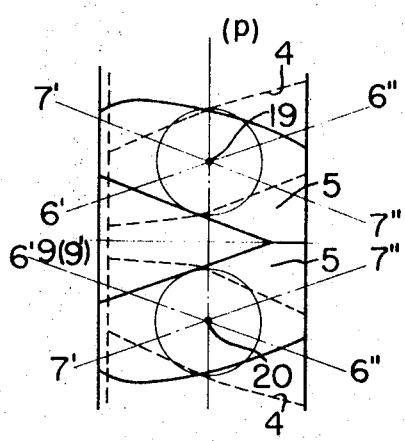

In the first embodiment shown in FIGS. 1 through 10, an outer joint member 1 having one shaft coupled thereto has a cavity whose wall surface is comprised of a cylindrical surface in spaced apart relation with an outer cylindrical surface of an inner joint member 2 by a suitable distance. The inner joint member 2 has a shaft coupled thereto by a spline. In the inner surface of the outer joint member 1 are formed three pairs of ball retaining grooves 4, each pair of grooves comprising two symmetrically inclining and intersecting grooves as best shown in FIG. 3. In the outer surface of the inner joint member 2 are formed three pairs of grooves 5, each pair of grooves comprising two symmetrically inclining and intersecting grooves, the direction of inclination being opposite to that of its corresponding groove of the outer joint member 1. Thus as shown in FIG. 6, the grooves of the outer joint member and the grooves 5 of the inner joint member are interesecting with one another and 6 balls for power transmission are filled in the grooves 4 and 5 at their intersections. The power transmitting balls 3 are only guided by the grooves 4 and 5.

In FIG. 1, one group of balls 3 alternately selected transmit the power in the clockwise direction while the other group of balls 3, in the counterclockwise direction.

As shown in FIGS. 4 and 5, the cross-sectional configurations of the ball retaining grooves 4 and 5 are arcs of a circle whose radius $r$ is substantially equal to that of the ball 3. When the axes 9 and 9' of both of the outer and inner joint members are aligned with each other as shown in FIGS. 1 and 2, the loci 6'-6": and 7'-7" traced by the centers 6 and 7 of the radii $r$ of both of the grooves 4 and 5 are straight lines lying in each of the planes 16, 17 and 18 which are equidistantly spaced apart from the axes 9 and 9' of the both joint members 1 and 2. These three planes 16, 17 and 18 form a regular triangle as shown in FIG. 1. FIG. 6 shows the projections of the ball grooves 4 and 5 projected upon the plane 16. The solid lines indicate the grooves 5 of the inner joint member while the broken lines indicate the grooves 4 of the outer joint member. Chain lines 6'-6" indicate the loci of the centers 6 of the radii $r$ of the grooves 4 while chain lines 7'-7" indicate the loci of the centers 7 of the radii $r$ of the grooves 5. At the intersections 19 and 20 of these two loci 6'-6" and 7'-7" are positioned the centers of the balls 3 and these intersections 19 and 20 are lying in the straight line normal to the axes 9 and 9'.

In the constant-velocity universal joint having the construction as described hereinabove, when the inner joint member 2 slides into the outer joint member 1 in the axial direction thereof, and when the axes 9 and 9' are aligned or colinear with each other as shown in FIG. 6, the balls 3 are caused to move toward the left in the grooves 4 and 5 so that the intervals between the balls are reduced and finally the balls are made in contact with one another. On the other hand, when the inner joint member 2 is caused to slide outwardly of the outer joint member 1 in the axial direction, the balls 3 are caused to move toward the right so that the intervals between the balls 3 are widened and the balls 3 finally contact with a ball movement stop 21 fixed attached to the inner end of the shaft in contact with the inner joint member 2, whereby the sliding motion of the balls 3 are limited. This stop 20 may be a ring which is resiliently fixed to either of the inner or outer joint members 2 or 1.

Figure 7:
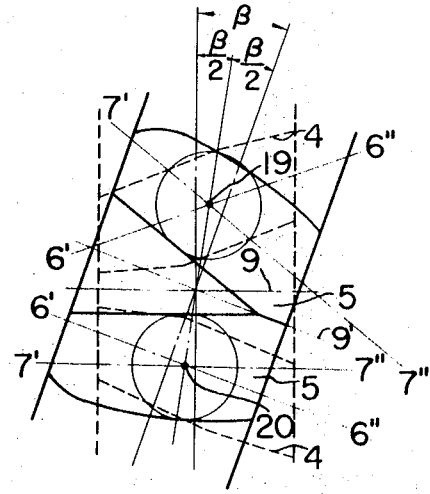
Figure 8:
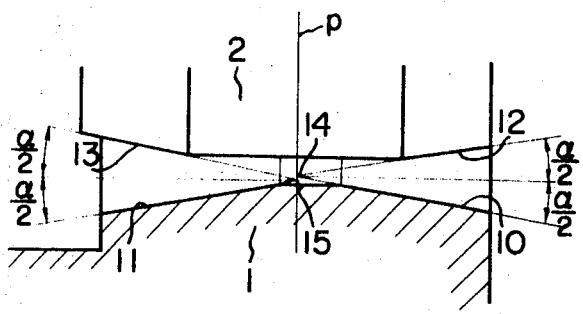

When the axes 9 and 9' are inclined with respect to each other as shown in FIG. 7, one portion of the inner joint member 2 is moved into the outer joint member 1 while the other portion of the inner joint member 2 is moved outwardly of the outer joint member 1 so that the balls are positioned in closely spaced-apart relation with one another and in widely spaced apart relation depending upon the positions of the balls.

The inner surface of the outer joint member 1 and the outer surface of the inner joint 2 are provided with two conical surfaces respectively 10 and 11; and 12 and 13. All of these conical surfaces are inclined at an angle one half the maximum angle $\alpha$ of inclination between both axes 9 and 9' which is previously determined depending upon the application of the universal joint. Some of these conical surfaces are shown in the enlarged view of FIG. 8, and are broken in part because of the provision of grooves 4 and 5. The intersection 14 of the extensions of both of the opposing conical surfaces 10 and 12 of the outer and inner joint members 1 and 2 and the intersection 15 of the extensions of both of the opposing conical surfaces 11 and 13 are lying in the plane P containing the centers of the balls and being normal to the axes 9 and 9' when these axes are aligned or colinear with each other. That is, the plane P is the plane containing the intersections 19 and 20 between the loci 6'-6" and 7'-7" of the centers 6 and 7 of the radii of the grooves and being normal to the axes 9 and 9'.

Figure 9:
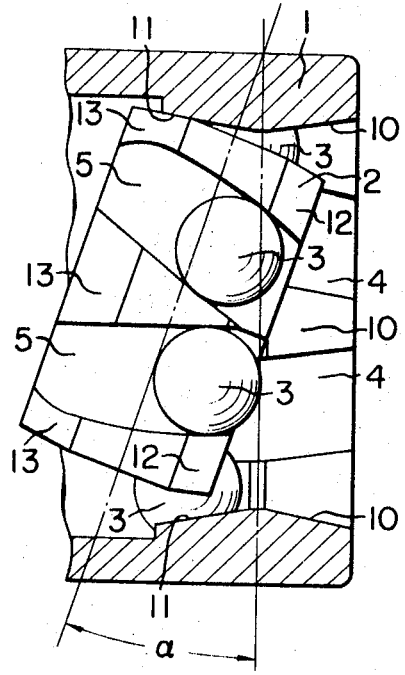
Figure 10:
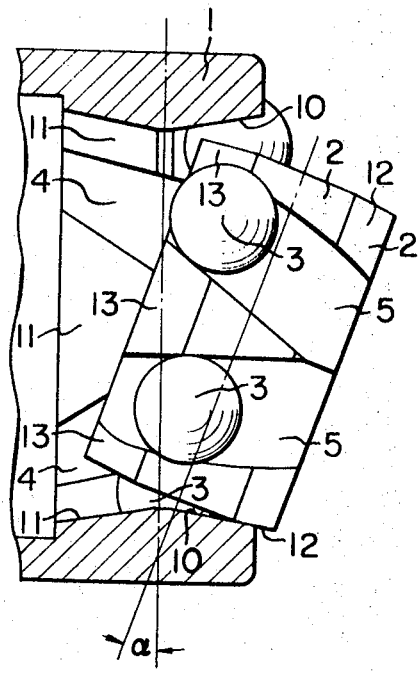

Since the intersecting lines of these conical surfaces are lying in the plane P as described above, when the shafts coupled to the joint members respectively are inclined through a large angle relative to each other and when the inner joint member 2 is in the slidable movement into the inside of the outer joint member in the axial direction as shown in FIG. 9 or when the inner joint member 2 is moving outwardly of the outer joint member 1 in the axial direction, the opposing conical surfaces 11 and 13 of the outer and inner joint members 1 and 2 makes a line contact therebetween or the conical surfaces 10 and 12 makes a line contact therebetween. Therefore, the inclination of both of the outer and inner joint members in excess of the predetermined angle $\alpha$ is prevented. This is true in all positions and directions of both of the members relative to each other so that even when the axial sliding displacement of one member relative to the other is large, the inclination between the members can be maintained less than their maximum angle $\alpha$ of inclination. Since the inclination angle between two members can be positively maintained less than the maximum angle $\alpha$ of inclination so that the balls can be prevented from being removed out of the retaining grooves or locked even if the sliding distance of the members is increased. Thus, the constant-velocity universal joint which can permit a larger axial slidable movement of the joint members can be provided. In the embodiment described in detail hereinabove, the joint has been shown as having 6 balls, but it will be understood that 4 or 8 balls may be used as needs demand.

Figure 11:
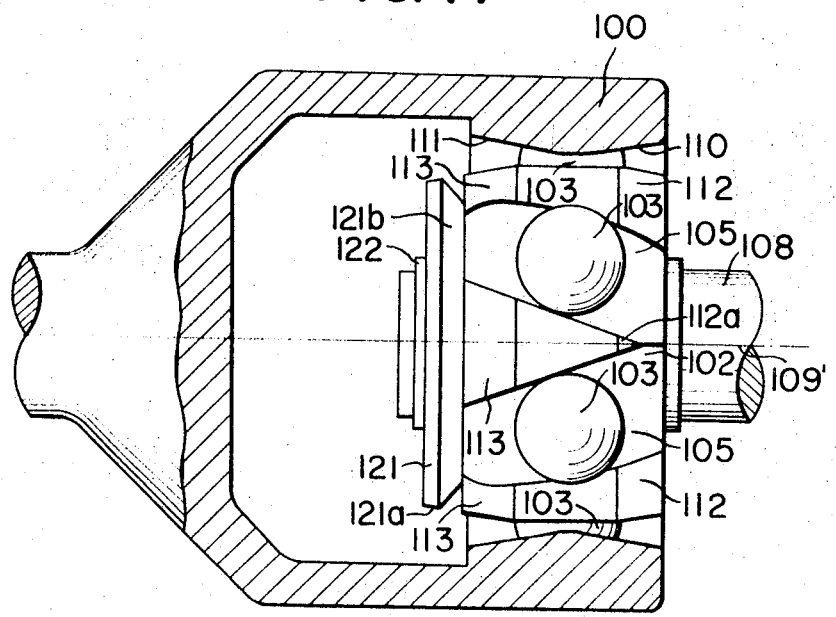
FIG. 11 through 13 show second embodiment of this invention.
Figure 12:
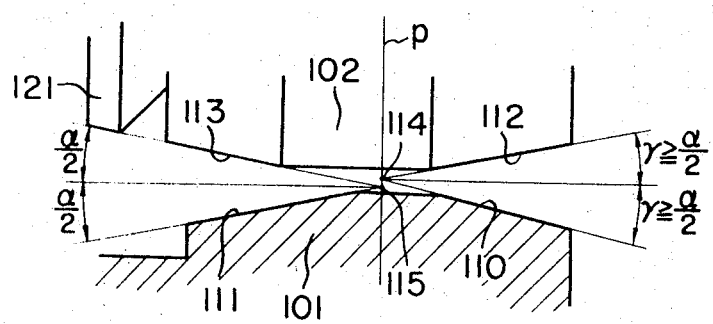
Figure 13:
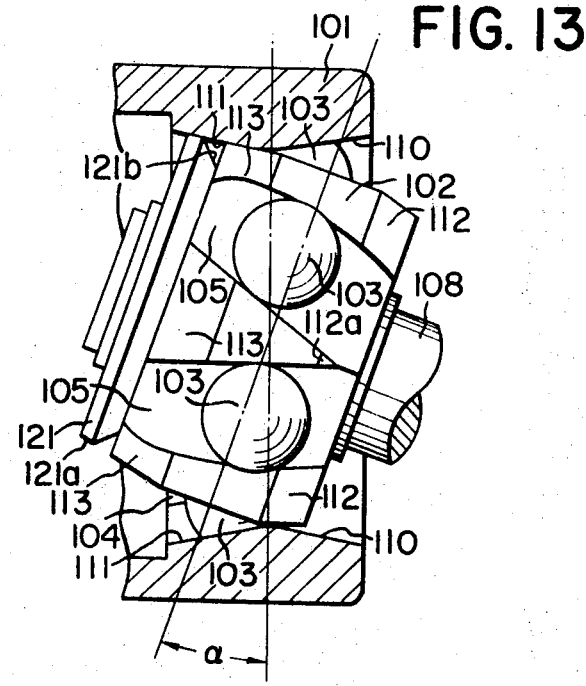
Figure 14:
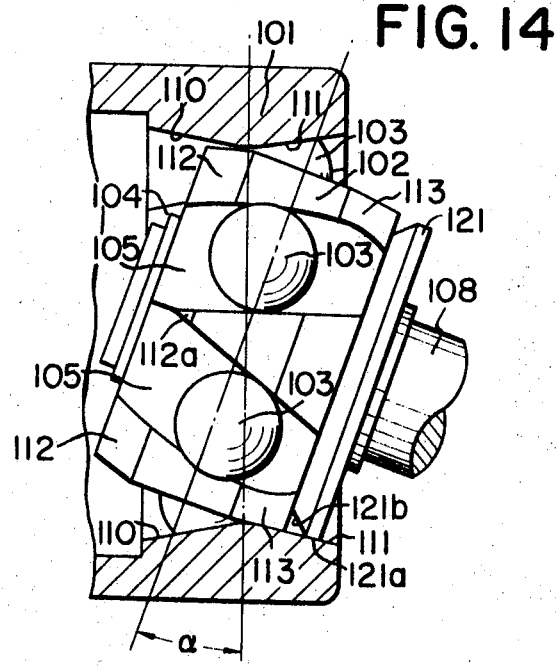
FIG. 14 shows the third embodiment in which ball grooves in the outer and inner joint members are intersected to each other in the opposite direction to said second embodiment.

FIGS. 11 through 13 show the second embodiment and FIG. 14 shows the third one and the portions corresponding to the portions in the first embodiment are designated by the same reference numbers plus one hundred, respectively.

In the second and third embodiments, as shown in FIG. 11, when the axial centre lines 9, 9' coincide as seen in FIG. 6, balls 103 shift to the left guided by the ball grooves 104 and 105 so that the balls 103 contact each other, and when the inner joint member 102 is caused to slide outwardly of the outer joint member 101 in the axial direction, the balls 103 move toward the right so that intervals between the balls 103 are increased and balls are stopped by contacting with the side surface 121b of the plate 121 of the ball movement stop means fixed to the shaft 108 at its end by a stop ring 122.

The inner surface of the outer joint member 101 and the outer surface of the inner joint member 102 are provided with two conical surfaces 10, 11, and 12, 13, respectively. Although these conical surfaces are separated by ball groves 104 and 105, the conical surface 113, at which the ball grooves 105 are not intersected, and the conical surface 111, at which the ball grooves 104 are intersected, are inclined at an angle one-half the maximum angle $\alpha$ of inclination between both axes 109 and 109', which is predetermined depending on the application of the universal joint, as shown in FIG. 12, and the intersection 115 of the conical surfaces 111 and 113 are lying in the plane P perpendicular to the axial center lines 109, 109' including the center of ball 103 when center lines 109 and 109' coincide.

On the other hand, the conical surface 112, at which the ball grooves 105 are intersecting, and the conical surface 100, at which the ball grooves 104 are not intersecting, incline with an angle of $\gamma$, which is equal to or larger than the half of the angle $\alpha$, to the axial center lines 109, 109' and the intersection of the extension of both surfaces 100 and 104 is on the plane P as shown in FIG. 12.

FIG. 13 shows the state in which the inner and outer joint members are inclined through a large angle relative to each other, so that the conical surface 113 and the surface 111 make a line contact therebetween. Therefore, the inclination of both of the outer and inner joint members in excess of the predetermined angle α is prevented. This is true in all positions of both joint members, so that even when the inner joint member 102 axially moves into the inside of the outer joint member 101 so that the peripheral surface 121a may not contact with the conical surface 111, the conical surface 113 will contact so as to limit the inclination not exceeding said angle α. When the joint member is reversely moved, the conical surface 113 may not contact with the conical surface 111, so that the axial length of the stop plate 121 is predetermined so as that the peripheral surface 121a will contact with the conical surface 111 at an angle α. In this case, when the inclination angle γ of the conical surfaces 110 and 112 is equal to α, the surfaces 110 and 112 are contacting to each other, but when γ is larger than α, they do not contact. The angle γ is appropriately determined by considering strength of the conical portion 112a and the depth of the ball grooves 104 and 105 necessary for retaining balls 103.

FIG. 14 shows the third embodiment in which the direction of the intersection of the ball grooves 104 and 105 is opposie to that of the second embodiment.

As mentioned above, in accordance with the second and third embodiments, the inclination of the outer and inner joint members is restricted to a predetermined angle α by the contact of the conical surfaces 111 and 113, and 110 and 112 in certain conditions, without the fear of locking or removal of the balls. When the axial length of the joint members is shortened, there is a fear that the facing conical surfaces do not contact, but, in these embodiments, since the peripheral surface 121a is made on a conical surface extending from the conical surface 113 so that the surface 121a can contact with the conical surface 111 to limit the inclination of the inner and outer joint members within the angle α. In other words, the axial length of the joint members can be shortened by compressing it with the simple shaped stop plate 121 having the conical surface 121a, which reduces the cost of manufacture. Furthermore, the conical surface portion 112a of the inner joint member which is reduced in size since the grooves 5 are symmetrically intersecting, can be protected by adjusting the angle γ so as to avoid the contact of the conical surfaces 110 and 112 but contacting the conical surface 111 with the peripheral surface 121a. In these embodiments an even number of balls can be used not limited to six balls as shown in the embodiments.

What is claimed is:

1. A constant-velocity universal joint comprising an outer joint member having a shaft coupled thereto, an inner joint member having a shaft coupled thereto, an even number of power transmitting balls interposed between said outer and inner joint members and ball movement stop means fixedly secured to either one of said inner and outer joint members, each ball being fitted into two intersecting grooves at the intersection thereof, and adapted to be guided in movement only by said grooves, one of the grooves being formed in the inner surface of said outer joint member in such a manner that two grooves thereof are symmetrically inclined and intersected with each other, the other grooves being formed in the outer surface of said inner joint member in such a manner that two grooves thereof are symmetrically inclined with each other in the directions opposite to those of said grooves and intersected with each other, the loci of the centers of the radii of said grooves being the straight lines lying in each of planes whose number is one half the number of said balls and which are equi-distantly spaced apart from the axes of said outer and inner joint members when said axes are aligned with each other, a space being defined between the inner surface of said outer joint member and the outer surface of said inner joint member, characterized in that the inner surface of said outer joint member and the outer surface of said inner joint member have conical surfaces in opposed relation and inclined at an angle one half the maximum joining angle between the axes when these axes are aligned with each other; and the intersecting line between the extensions of the opposed conical surfaces of said outer joint member and of said inner joint member and the intersecting line between the extensions of the opposed conical surfaces of said outer and inner joint members are lying in a plane containing the centers of the balls and being normal to said axes.

2. A constant-velocity universal joint comprising an outer joint member having a shaft coupled thereto, an inner joint member having a shaft coupled thereto, an even number of power transmitting balls interposed between said outer and inner joint members and ball movement stop means fixedly secured to either one of said inner and outer joint members, each ball being fitted into two intersecting grooves at the intersection thereof, and adapted to be guided in movement only by said grooves, one of the grooves being formed in the inner surface of said outer joint member in such a manner that two grooves thereof are symmetrically inclined and intersected with each other, the other grooves being formed in the outer surface of said inner joint member in such a manner that two grooves thereof are symmetrically inclined with each other in the directions opposite to those of said grooves and intersected with each other, the loci of the centers of the radii of said grooves being the straight lines lying in each of planes whose number is one half the number of said balls and which are equi-distantly spaced apart from the axes of said outer and inner joint members when said axes are aligned with each other, a space being defined between the inner surface of said outer joint member and the outer surface of said inner joint member, characterized in that the inner surface of the outer joint member and the outer surface of the inner joint member have conical surfaces respectively, in opposed relation, the conical surface of the inner joint member at the side where the ball grooves do not intersect and the conical surface of the outer joint member at the side where the ball grooves are intersecting to each other are inclined by an angle one half of a necessary joint angle relative to the axial center lines, the intersection of the extension of the conical surfaces locates on the plane perpendicular to said center lines including the centers of balls when the both center lines coincide, a stop plate of said ball movement stop means is fixed at the inner joint member of the side where the ball grooves do not intersect, the outer peripheral surface of the stop plate being formed as a conical surface on the extension of said conical surface of the inner joint member, said conical surface of the inner joint member at the side where the ball grooves intersect each other and the conical surface of the outer joint member at the side where the ball grooves do not intersect are inclined to the axial center line by an angle which is equal to or larger than one half of the joint angle and the intersection line of the extension of the conical surfaces locates on said plane when the axial center lines are coinciding.

References Cited

UNITED STATES PATENTS

| | | | |
|---|---|---|---|
| 3,002,364 | 10/1961 | Bellomo | 64—21 |
| 3,298,200 | 1/1967 | Atmann et al. | 64—21 |
| 3,475,924 | 11/1969 | Aucktor | 64—21 |

EDWARD G. FAVORS, Primary Examiner